United States Patent
Mortezaie

(10) Patent No.: US 12,085,931 B1
(45) Date of Patent: Sep. 10, 2024

(54) AUTOMATED ADJUSTABLE DELIVERY TABLE DEVICE AND SYSTEM

(71) Applicant: Mohammad Mortezaie, Boca Raton, FL (US)

(72) Inventor: Mohammad Mortezaie, Boca Raton, FL (US)

( * ) Notice: Subject to any disclaimer, the term of this patent is extended or adjusted under 35 U.S.C. 154(b) by 625 days.

(21) Appl. No.: 17/195,532

(22) Filed: Mar. 8, 2021

Related U.S. Application Data

(60) Provisional application No. 62/986,170, filed on Mar. 6, 2020.

(51) Int. Cl.

| | |
|---|---|
| *G05D 1/00* | (2006.01) |
| *A47B 9/16* | (2006.01) |
| *A47B 9/20* | (2006.01) |
| *B60G 17/015* | (2006.01) |
| *B60L 50/50* | (2019.01) |

(Continued)

(52) U.S. Cl.
CPC ............. *G05D 1/0016* (2013.01); *A47B 9/16* (2013.01); *A47B 9/20* (2013.01); *B60G 17/0157* (2013.01); *B60L 50/50* (2019.02); *B60L 53/60* (2019.02); *G08C 17/02* (2013.01); *B60L 2220/46* (2013.01)

(58) Field of Classification Search
CPC ....... G05D 1/0016; G08C 17/02; B60L 53/60; B60L 2220/46; B60G 17/0157; A47B 9/20; A47B 9/16
See application file for complete search history.

(56) References Cited

U.S. PATENT DOCUMENTS

| | | | | |
|---|---|---|---|---|
| 3,963,288 A | * | 6/1976 | Burnett .................... | A47B 9/04 108/139 |
| 10,524,564 B1 | * | 1/2020 | Wu .......................... | A47B 9/20 |

(Continued)

*Primary Examiner* — Tony H Winner
(74) *Attorney, Agent, or Firm* — LHOTA & ASSOCIATES, P.C; David P. Lhota, Esq.

(57) ABSTRACT

A smart automated, motorized and adjustable table delivery device and system including an artificial intelligence technology, sensors, motor, telescopic support leg and mobile communication device app that adjusts in height and automatically traverses a building structure, such as a home, restaurant, hospital or office, to designated locations within the structure to make available or deliver items, such as drinks, food or other requested items, based on voice or app commands, wherein the automated delivery table device may be automatically controlled for movement around a desired area and height adjustment, the table device having a base with wheels, table top, a plurality of linear threaded rail supports corresponding to the number of elevation levels, microprocessor or CPU with a receiver or transceiver to receive wireless signals or transmissions for remotely controlling movement of the device in a designated area and height adjustment of the table top, depth sensors for sensing impending contact with walls or furniture, lift plates corresponding to the number of table tiers and threadably receiving the threaded rail supports for adjusting the height of the table top, lifting motors for spinning the leg or rail supports, telescopic walls engaged to the table tiers that extend and retract when raised and lowered, respectively, drive motor in communication with at least one wheel for facilitating traversing movement and bumpers around the base.

5 Claims, 8 Drawing Sheets

(51) Int. Cl.
*B60L 53/60* (2019.01)
*G08C 17/02* (2006.01)

(56) References Cited

U.S. PATENT DOCUMENTS

| | | | |
|---|---|---|---|
| 10,959,514 B2* | 3/2021 | Klinke | A47B 9/00 |
| 2005/0191999 A1* | 9/2005 | Tezuka | G08C 17/02 |
| | | | 455/420 |
| 2011/0203496 A1* | 8/2011 | Garneau | B60N 3/001 |
| | | | 248/404 |
| 2017/0099943 A1* | 4/2017 | Joshi | A47B 9/20 |
| 2018/0360208 A1* | 12/2018 | Liao | A47B 21/02 |
| 2021/0155464 A1* | 5/2021 | Takai | B66F 7/065 |
| 2021/0368974 A1* | 12/2021 | Sudoh | A47B 9/16 |

* cited by examiner

10

| Parts | Disc | |
|---|---|---|
| Acrylic | Structure for Table and parts | 14 |
| Acrylic | Base for motor Mount | 27 |
| Gearbox+ | Drive Train | 17 |
| Drive train Motor | Drive Train | 17 |
| Wheels | Motion | 13 |
| Hubs | Mounting wheels to shaft | 13 |
| Speed Controllers | Motor Drivers for Drive Train | 17 |
| Batteries | Power the system | 40 |
| Charger | Charge the battery | 42 |
| Battery Connectors | Connections for Speed Contn | 43 |
| Stepper motors | Motors for Driving Table Up/Down | 18 |
| Lead Screws | Lead Screw for Up/Down Mo | 16 |
| Nuts | For Lead Screws | 16 |

FIG. 12

AUTOMATED ADJUSTABLE DELIVERY TABLE DEVICE AND SYSTEM

CROSS-REFERENCE TO RELATED APPLICATION

This application claims the benefit of provisional patent application Ser. No. 62/986,170 filed Mar. 6, 2020.

STATEMENT REGARDING FEDERALLY SPONSORED RESEARCH OR DEVELOPMENT

N/A

FIELD OF THE INVENTION

The present invention relates to an automated delivery table, and in particular, to a smart automated, motorized and adjustable table delivery device and system including an artificial intelligence technology, sensors, motor, telescopic support leg and mobile communication device app that adjusts in height and automatically traverses a building structure, such as a home, restaurant, hospital or office, to designated locations within the structure to make available or deliver items, such as drinks, food or other requested items, based on voice or app commands.

BACKGROUND OF E INVENTION

With advancements in technology there is still a need for automated mobile devices that deliver desired items, such as food or drinks, facilitate telecommunication via Wi Fi or cellular, accommodate computers and tablets, provide Internet access and integrate health monitoring technology in a single unit. A variety of robots, mobile robots, mobile carts and carts with robotic arms are known in the art. These devices are limited in options and automation. For instance, one robot known merely comprises a vacuum that traverses a dwelling to vacuum. While this robot has sensors to detect walls and furniture they have to be programmed and often become stuck and provide no features to make living more comfortable, convenient and safe. Mobile carts with robotic arms are also known. Another mobile cart is known that only dispenses medication. There is also an apparatus known that can transport an item from one location to another without providing other needed features. These known devices are not automatic, not operable by a mobile communication app, do not deliver items with adjustable delivery, provide beverages such as water, have a monitor for watching the Internet or television, smart tablets, USB's for charging mobile communication devices, medical features for checking vitals and similar technologies that provide enhanced conveniences and comfort.

For instance, U.S. Pat. No. 10,500,722 discloses a method that includes maneuvering a robot in (i) a following mode in which the robot is controlled to travel along a path segment adjacent an obstacle, while recording data indicative of the path segment, and (ii) in a coverage mode in which the robot is controlled to traverse an area. The method includes generating data indicative of a layout of the area, updating data indicative of a calculated robot pose based at least on odometry, and calculating a pose confidence level. The method includes, in response to the confidence level being below a confidence limit, maneuvering the robot to a suspected location of the path segment, based on the calculated robot pose and the data indicative of the layout and, in response to detecting the path segment within a distance from the suspected location, updating the data indicative of the calculated pose and/or the layout.

U.S. Pat. No. 10,485,623 discloses an arm cart operable to transport a robotic arm to and/or from a surgical table. The robotic arm can be coupled to the arm cart via a connector. The connector can be slidably mounted to the arm cart such that the connector and the robotic arm, collectively, can move relative to the arm cart. For example, when the arm cart is adjacent to the surgical table, the connector and the robotic arm can be movable to provide final, fine adjustments to align the robotic arm with a coupling portion of the surgical table U.S. Pat. No. 10,168,711 discloses an autonomously-navigating mobile robot that moves to a designated location and detects the presence and relative positioning of a compatible wheeled cart, based on recognizing one or more characteristic physical features of the cart from sensor readings taken by the robot. The robot moves into a position of gross alignment with the cart, based on the detected relative position of the cart, which means that the robot accommodates carts that are not properly positioned or oriented for pickup. The robot is not adjustable.

U.S. Pat. No. 10,118,632 discloses a multipurpose manual mobile utility lifting ergonomic cart consists of a structural frame, a platform, at least one insert, a plurality of wheels, and a height-adjustable arm. The height-adjustable arm extends from the structural frame and is connected to the platform. The platform provides workspace for the user by being attached to the at least one insert that can be, but is not limited to, a dish drying rack, a podium insert, or a house cleaner rack. The structural frame can be used for holding items such as boxes or cleaning supplies. The plurality of wheels allows the user to move the apparatus from one location to another. However, this cart is not automated.

U.S. Pat. No. 10,093,335 discloses a manual mobile housekeeping cart having a base supported by casters and wheels, where the casters have user-accessible swivel-lock levers to aid in controlling the motion of the mobile cart. Brackets extend downward from the corners of the base as housings for wall-protecting corner rollers. The corner rollers are positioned at a sufficiently low height so that the adjustable shock absorption rollers will impact base trim on walls instead of the wall surfaces themselves. The cart also has a main body storage area with an adjustable shelf, and a top storage area with a top hood. Handles are provided for user control of the cart, as well as to provide an attachment area for removable side storage bags, as well as providing attachment of tools and cleaning supplies.

U.S. Pat. No. 9,155,682 discloses a mobile cart for dispensing medications has an automated locking mechanism for selectively opening the drawers of such cart. The locking/unlocking both unlocks and moves a respective drawer on command from a signal panel that is connected to a computerized controller. The caregiver enters an authorizing codes and patient identifiers so that one drawer unlocks and opens slightly. As such, the unlocked drawer is identified by lock mechanism, which slightly opens the drawer, thereby identifying the unlocked drawer in comparison to other closed, locked drawers.

The foregoing patent references fail to disclose an automated adjustable smart table that is operable by a mobile communication app to be height adjustable, deliver items such as food or drinks to family or guests, facilitate telecommunication via Wi Fi or cellular, accommodate computers and tablets, provide internet access, have USB's for charging mobile communication devices, have a monitor for accessing the Internet or television, provide smart tablets and integrate health monitoring technology for checking vitals and giving medication reminders in a single unit. If there existed a smart automated adjustable and mobile table having all the foregoing features in a single unit, it would be well received. As there are no such smart, automated adjustable and mobile tables or carts known having all the above noted features, there exists a need for such a device. It is, therefore, to the effective resolution of the aforementioned problems and shortcomings of the prior art that the present invention is directed. The instant invention addresses this unfulfilled need in the prior art as contemplated by the instant invention disclosed.

SUMMARY OF THE INVENTION

In light of the foregoing, it is an object of the present invention to provide an automated delivery table device that can be remotely and automatically controlled for delivering food, drink, medicines, or other desired items.

It is also an object of the instant invention to provide an automated delivery table device that can facilitate communication via Wi-Fi or cellular.

It is another object of the instant invention to provide an automated delivery table device that accommodates use of computers, tablets or mobile communication devices through Wi Fi, Bluetooth, cellular or USB connections.

It is an additional object of the instant invention to provide an automated delivery table device operable by a software app on a mobile communication device.

It is a further object of the instant invention to provide an automated delivery table device that has an, adjustable height for elevating the table during use or retracting it for storage.

It is yet another object of the instant invention to provide an automated delivery table device having a monitor for accessing the Internet, cable, or other telecommunication systems.

It is yet a further object of the instant invention to provide an automated delivery table device that provides medical information and reminders for taking medicine.

In accordance with one aspect, the present invention provides an automated delivery table device including artificial intelligence (AI) and a mobile communication app that facilitates convenient use and automated operation of the table device such that it can be controlled by voice or the app on a mobile communication device. The table is adjustable, mobile, and intelligent such that it can be used in hospitals, nursing homes, schools or for handicap people to deliver food, beverages, medicine, administer health vitals testing, give reminders for medicine or doctor appointments, provide a computer work station or entertainment device, and may be programmed with set points in a room, house or building for navigating predetermined areas and with tasks or services to perform. The automated delivery table device may connect to the Internet and log into a property appraiser website to download structure information on a dwelling or building to set navigation parameters, may be operated by a plurality of people with the app, such as everyone in a family, hospital personnel or business office workers, wherein the app can be personalized for individuals for performing certain functions and to navigate certain rooms and stores these settings in memory so an individual can select and activate their personal settings.

In another aspect, the present invention provides has an automated delivery table device having a base with wheels, table top, at least one telescopic leg or linear threaded rail support, microprocessor or CPU with receiver or transceiver for remotely controlling movement of the device in a building or room and height adjustment of the table top, depth sensors for sensing impending contact with objects such as walls or furniture, lift plates corresponding to the number of table tiers, lifting motors for controlling the leg or rail supports to vertically move the table tiers up and down to adjust the height of the table top, telescopic walls engaged to the table tiers that extend and retract when raised and lowered, respectively, and drive motor in communication with at least one wheel for facilitating traversing movement of the table device in a building, room or other controlled area.

In an additional aspect, the present invention provides an automated delivery table device that may be automatically controlled for movement around a desired area and height adjustment, the table device having a base with wheels, table top, a plurality of linear threaded rail supports corresponding to the number of elevation levels, microprocessor or CPU with a receiver or transceiver to receive wireless signals or transmissions for remotely controlling movement of the device in a designated area and height adjustment of the table top, depth sensors for sensing impending contact with objects such as walls or furniture, lift plates corresponding to the number of table tiers and threadably receiving the threaded rail supports for adjusting the height of the table top, lifting motors for spinning the leg or rail supports to vertically move the table tiers up and down to adjust the height of the table top, telescopic walls engaged to the table tiers that extend and retract when raised and lowered, respectively, drive motor in communication with at least one wheel for facilitating traversing movement and bumpers around the base. The table device may also include a cup or plate holder or connection to or communication with or through the Internet, as well as Bluetooth or Wi Fi.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 12 is a parts list for the automated delivery table device shown in FIGS. 1-11 in accordance with the preferred and alternative embodiments of the instant invention.

DETAILED DESCRIPTION OF THE INVENTION

Figure 1:
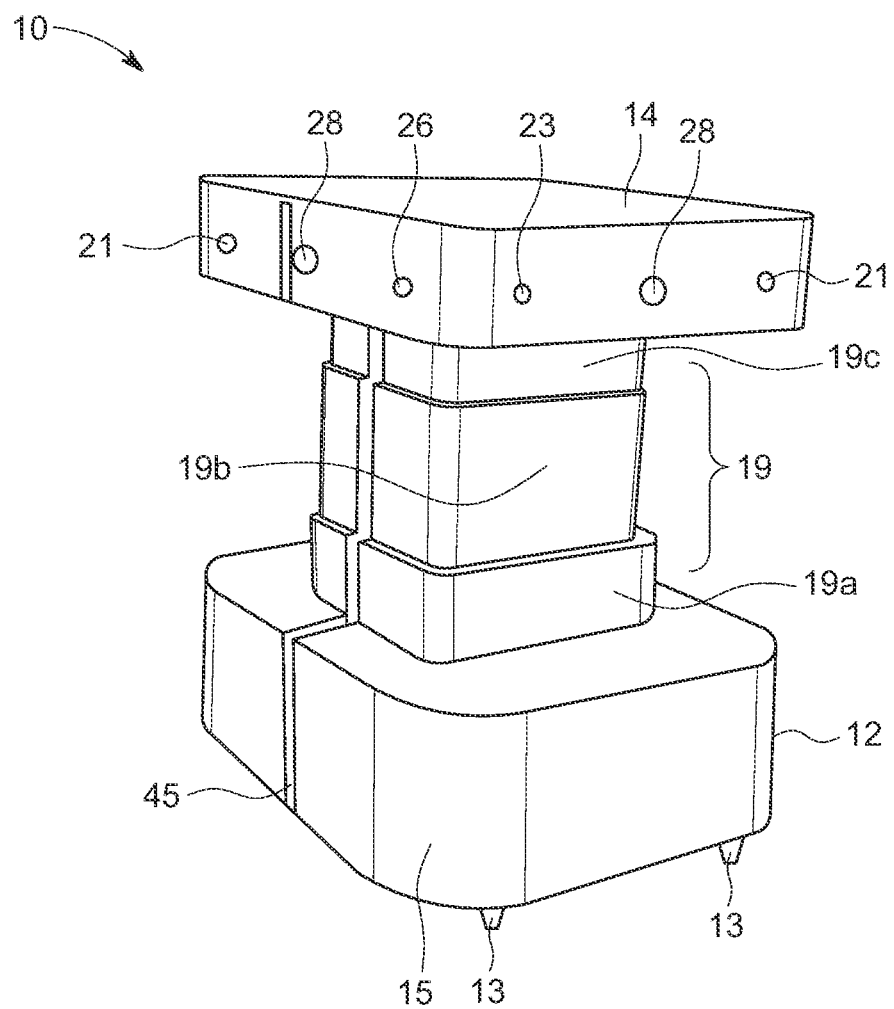
FIG. 1 is front perspective view of the automated delivery table device in accordance with the principles of the present invention.

With reference to the drawings in which like reference designators refer to like elements, FIGS. 1 to 12 depict the preferred and alternative embodiments of the instant invention, which is generally referenced as a smart table, automated table, delivery table, instant invention and, or by numeric character 10. Referring to the drawings, the automated smart delivery table 10 is generally directed to an automated smart mobile and adjustable table device 10 that can automatically deliver desired items, such as food, beverages, or medicine to any location in a dwelling or building, and, or provide an electronic workstation or entertainment unit. With reference to FIGS. 1-12, the automated smart delivery table 10 includes an adjustable and mobile table with artificial intelligence technology, sensors, memory, and motors that enable the delivery table 10 to be moved so as to traverse one or more rooms without bumping into furniture or walls, or at least with minimal contact with furniture and walls, and adjusted vertically for raising and lowering the table to the desired height of the user or lowered fully for storage. The instant invention 10 may also include a software app readable, processed, and operable by a mobile communication device such as a mobile phone, laptop, or iPad.

Referring to FIGS. 1-6 and 12, the automated delivery table device 10 includes a base 12, wheels 13, table top platform 14, a bumper 15, at least one linear threaded rail or screw 16, at least one driver motor 17 in communication with at least one wheel 13, at least one lifting motor 18 in communication with the threaded rail 16, extendable and retractable wall 19, microprocessor or CPU 20 supported in the table top 14 or base 12, at least one depth sensor 21, an environmental awareness sensor 23, at least one vertical lift sensor 26, a base platform 27, at least one camera 28, at least one lift plate 29, at least one threaded port 30, 31 or 32 in each lift plate 29a, 29b or 29c, respectively, a battery 40 and battery charger 42. The instant invention 10 preferably includes three screw rails 16a-c to correspond with three lift plates 29a, 29b and 29c which threadably mate with threaded ports or nuts 30, 31 and 32 on the lift plates 29a-c, respectively. Each plate 29a-c may have more than one screw rail 16. The first lift plate 29a communicates with at least one and preferably two first screw rails 16a which threadably mate with lead screw ports or nuts 30. The second lift plate 29b communicates with at least one and preferably two second screw rails 16b which threadably mate with the second tier screw ports or nuts 31. Likewise, the third lift plate 29c communicates with at least one and preferably two third screw rails 16c which threadably mate with the third tier screw ports or nuts 32. The second and third screw rails 16b and 16c pass through rail feed ports 33 defined in lift plates 29a, 29b or 29c to enable engagement with the corresponding screw ports or nuts 31, 32 on the second and third tier lift plates 29b-c as required for selective independent vertical movement of the first, second and third lift plates 29a-c when the respective screw rails 16a-c are rotated or spun. Each screw rail 16a-c is mounted to a lifting motor 18 which rotates in forward or backward to independently raise and lower the lift plates 29a-c. The drive motor 17 is communicated with and linked to the wheel assemblies 13 for rotating the wheels to cause the table device 10 to move forward and backward or left or right. The wheels 13 project outward from apertures fruit in the base plate 27 for engaging the ground or floor. Either the wheels 13 in the front or back are able to turn left or right for dictating direction of movement.

Figure 2:
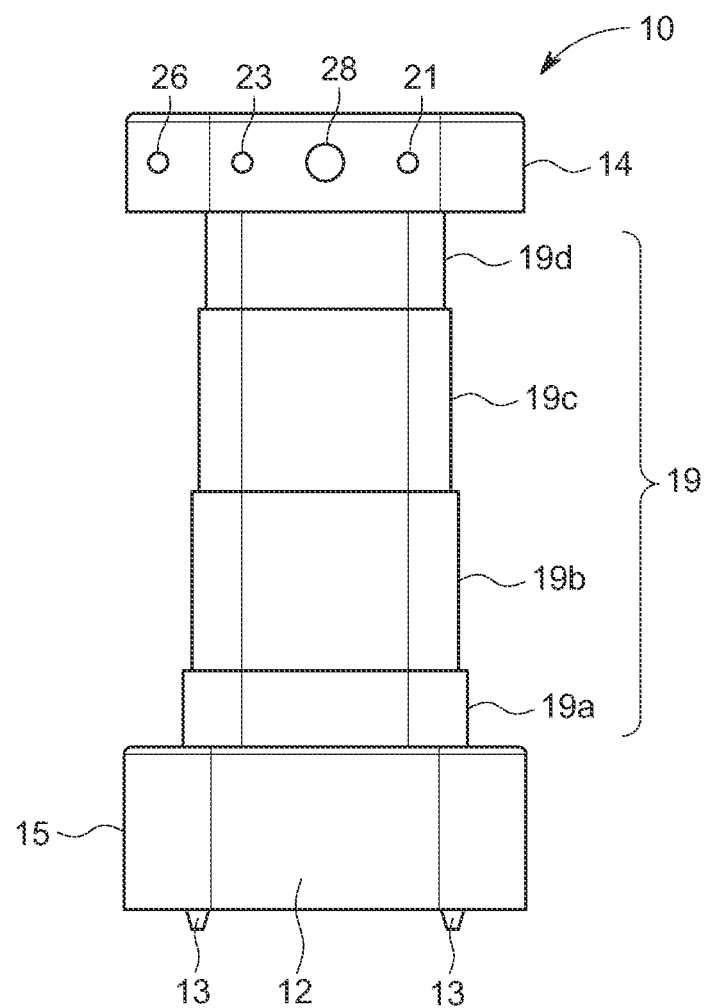
FIG. 2 is a front elevational view of the automated delivery table device shown in FIG. 1 illustrating the device in a fully extended position.

Still referring to FIGS. 1-6 and 12, the extendable and retractable wall 19 includes at least three wall tiers 19s-c corresponding to each lift plate 29a-c, wherein the first wall 19a engages or mounts to the first lift plate 29a, the second wall 19b engages or mounts to the second lift plate 29b and the third wall 19c engages or mounts to the third lift place 29c. The instant invention 10 may include four lift plates 29 and wall segments 19, as shown in FIG. 2. The number of lift plates 29 and walls 19 may vary without departing from the scope and spirt of the instant invention. The width or diameter of the lift plates 29 and walls 19, depending on rectangular, square, or circular designs, are sized to allow sliding mating engagement between the tiers 19, 29 when retracted and smooth extension when elevated. Accordingly, the inner width or diameter of the first lift plate 29a and wall 19a is slightly larger than that of the outer width or diameter of the second lift plate 29b and wall 19b, while the inner width or diameter of the second lift plate 29b and wall 19b is slightly larger than that of the outer width or diameter of the third lift plate 29c and wall 19c. The microprocessor or CPU 20 includes a receiver or transceiver for receiving control signal that are processed and transmitted to the drive motor(s) 17 and or lifting motor(s) 17 to control movement of the table device 10 around a room, building or dwelling and the elevation or retraction of the lift plates 29a-e to set the table top 14 to a desired height as demanded by a command signal selected from the app on a fixed or mobile communication device. The table 10 is completely retracted fully for storage but may be for use as well. The walls 19 may be made from acrylic. The table device 10 may include an aluminum strip 45 to join the walls 19 where the acrylic meets or wall ends meet when wrapped around the lift plates 29.

Figure 6:
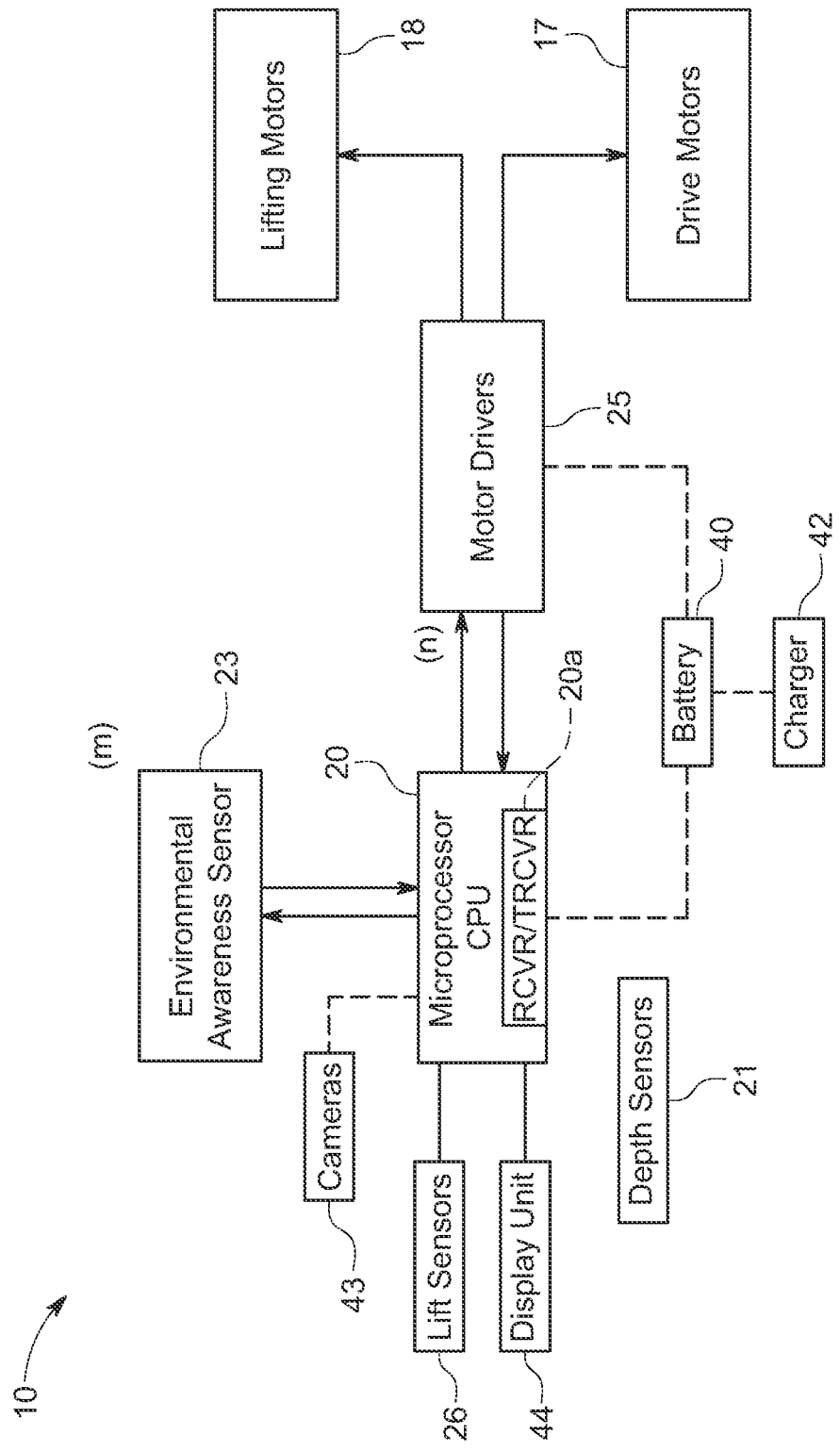
FIG. 6 is an electrical block diagram of the automated delivery table device in accordance with the principles of the present invention.
Figure 7:
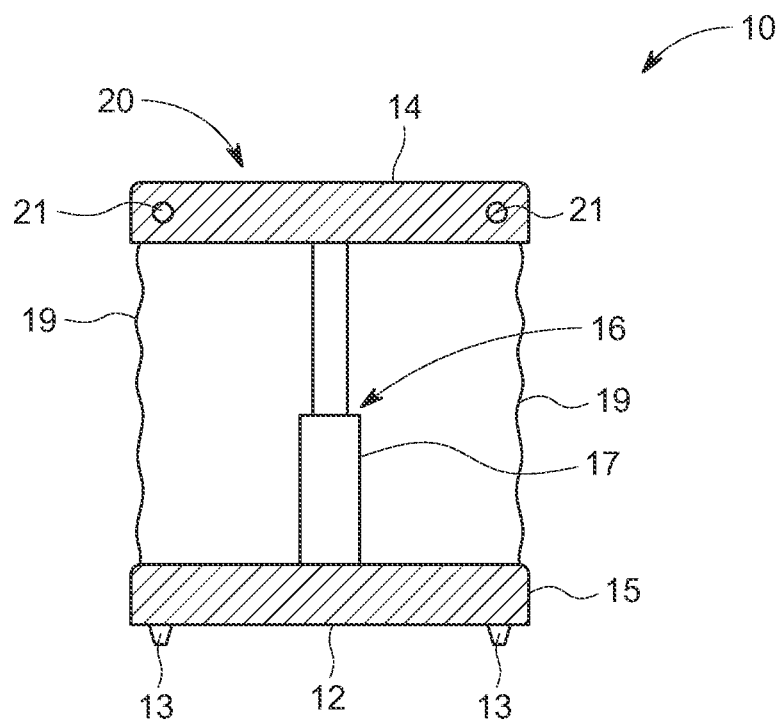
FIG. 7 is front elevational view of the automated table device in accordance with the general principles of an alternative embodiment of the present invention.

With reference to FIG. 6, the system block diagram of instant invention 10 includes a microprocessor or CPU 20 with a transceiver or receiver 20a, at least one and preferably a plurality of depth sensors 21, environmental awareness sensor 23, at least one vertical lift sensor 26, motor drivers 25, lifting motors 18, drive motors 17, battery 40, battery charger 42, at least one camera 43 and communication or entertainment display or unit 44. The receiver or transceiver 20a in the CPU 20 receives digital input commands from a communication device and app which is then processed by the CPU 20 to move, elevate, or retract the table device 10 as dictated and desired by the user. The automated delivery table device 10 preferably includes a camera 43 in the front and the back of the table device 10 with the sensors 21, 23 and 26 on the front and sides of the table device 10. Alternatively, each side may include a camera 43 and the sensors 21-26. The camera 43 reports location and activity in and around the table device and may also record video and audio of the corresponding surroundings. The environment awareness sensor 23 senses and reads ambient temperature and other weather conditions and transmits it to the CPU 20 for the user. The depth sensor(s) 21 monitor proximity to walls, furniture and other obstructions which is processed by the CPU 20 to prevent collisions. The lift sensor(s) 26 monitor, report and, or control the height that the table top 14 is elevated. The communication or entertainment display unit 44 reports on the table device's 10 operations, proximity, messages for medicine or other messages, and, or provides for direct control such as with a touch screen. The display unit 44 may also provide entertainment such as movies, TV or cable shows, music, Internet access or YouTube. The battery provides the necessary power to run the automated table device 10 and the battery charger 42 charges the battery 40. The motor driver 25 is connected to the lifting motors 18 and drive motors 17 to provide power to and control the lifting motors 18 and drive motors 17 for lifting the table top 14 and moving the table device 10 in accordance with commands received and processed by the CPU from the communication device and app.

Figure 3:
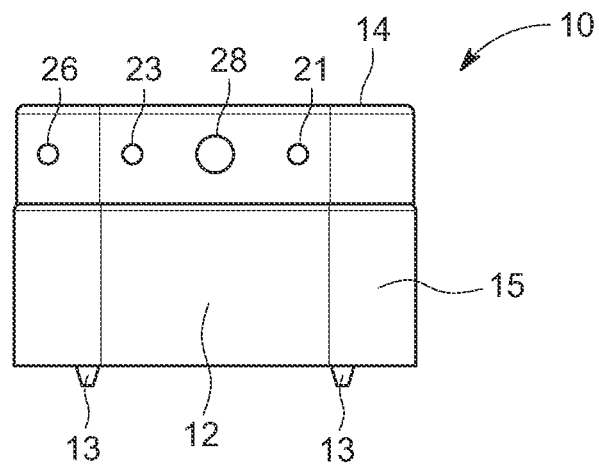
FIG. 3 is a side elevational view of the automated delivery table device shown in FIG. 1 illustrating device in a fully closed position.
Figure 4:
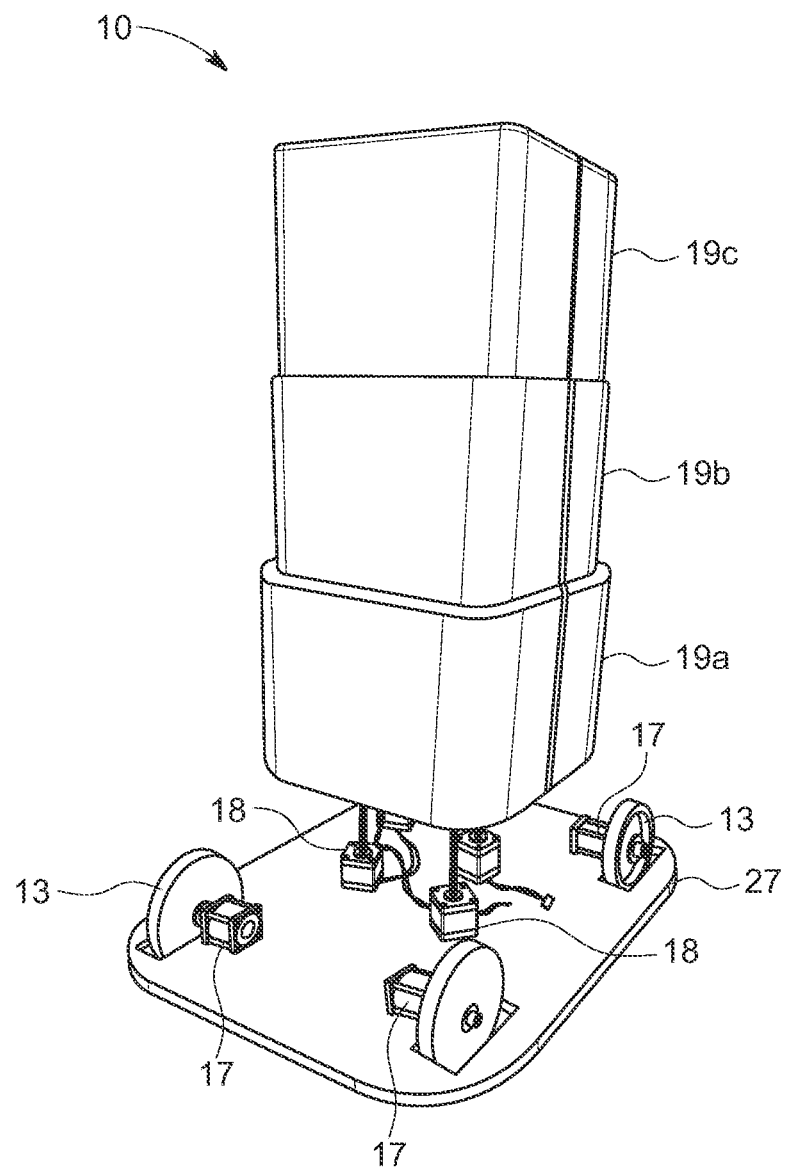
FIG. 4 is a perspective partial cut-away view of the automated delivery table device of FIG. 1 illustrating the base end with the base wall structure and table top removed.
Figure 5:
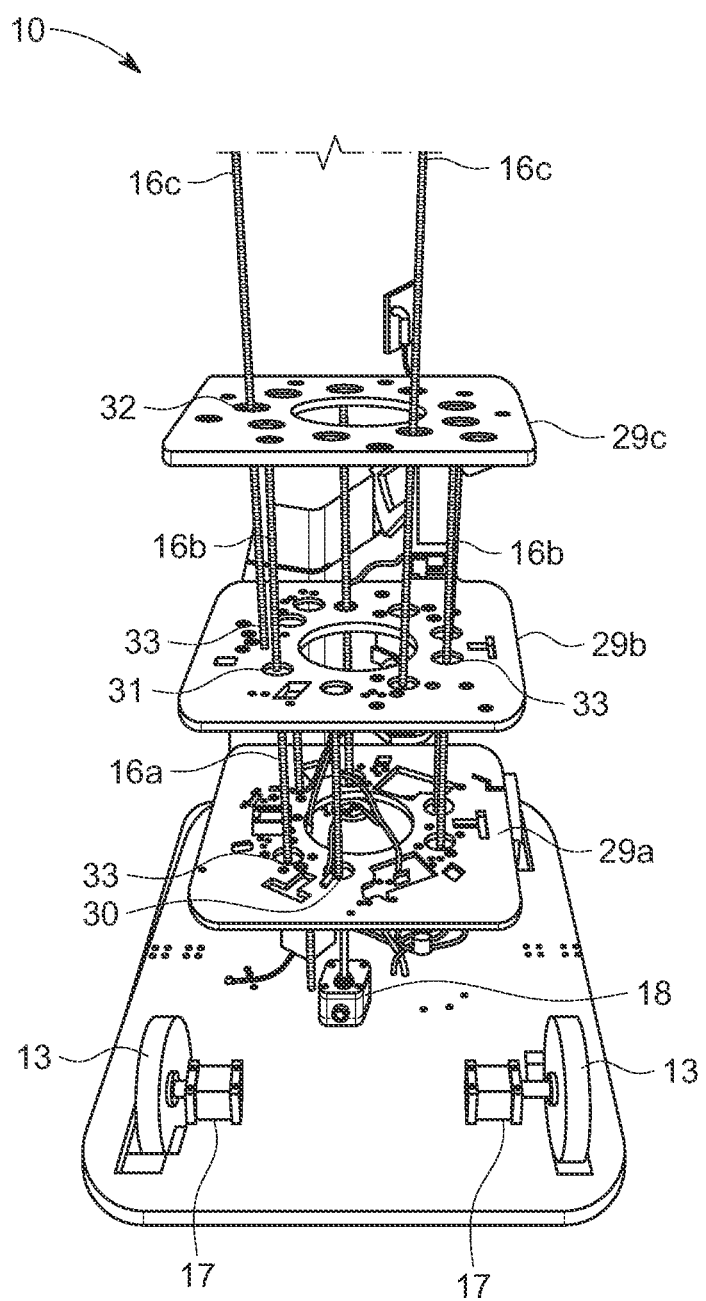
FIG. 5 is a perspective cut-away view of the automated delivery table device of FIG. 1 illustrating the interior construction for raising, lowering, and navigating the table device.

With reference to FIGS. 1-12, the instant invention 10 in all embodiments generally includes at least one rotatable rail or telescopic support leg supported on a base 12 for retracting and extending a table top 14 by at least one lift motor 18 or by an electro-hydraulic or electric piston assembly, collapsible and extendable walls 19 (19a-19d) surrounding the leg(s) 16 and a mobile communication software application ("app") operable by a mobile or fixed communication device for automatically controlling and traversing the smart table 10 to a designated location in a dwelling to deliver items based on voice commands or app commands. The instant invention 10 creates an internal electronic map of the structure or dwelling and may include sensors 21 for traversing a room or rooms without bumping into furniture or walls or getting stuck as it makes its way to a designated position. The instant invention 10 includes at least a bumper 15 around the base 12 or a dual bumper system 15 around the base 12 and height adjustable tabletop 14. The instant invention 10 may pull data from a property appraiser website to program the automated smart table 10 with topology information on the dwelling or structure. The instant invention 10 is compactable for storage, as shown in FIG. 3, and adjustable for access by anyone, including the elderly and handicapped. The smart automated table 10 includes touch sensors and may include at least one or multiple docking stations for charging the table 10 when not in use as well as USB ports for charging electronics such as mobile phones, iPads and laptop computers. The invention may include a handheld remote control and the wall may be an accordion style wall around the exterior. In another embodiment, the automated smart may have a water purifier for providing purified water or coffee maker 36. The instant invention 10 may be used in homes, restaurants, offices, hospitals or comparable structures for delivering food, beverages, medicine or other desired items.

Figure 8:
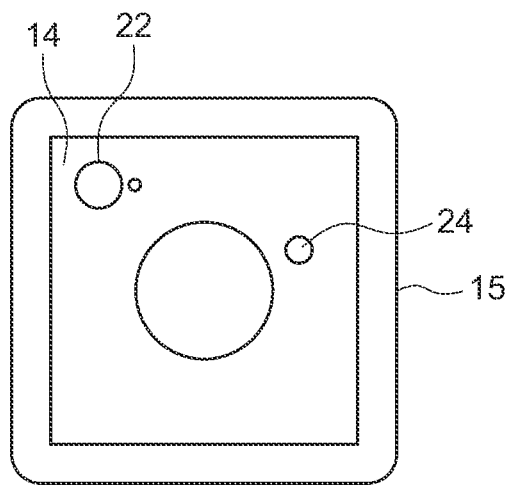
FIG. 8 is a top elevational view of the table device shown in FIG. 7 illustrating a square or rectangular top platform.
Figure 9:
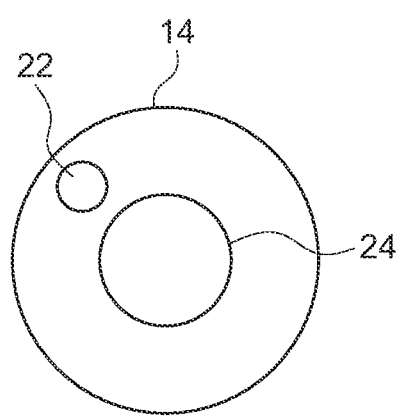
FIG. 9 is a top elevational view of the table device shown in FIG. 7 illustrating a circular top platform.

With reference to FIGS. 7-12, the automated or smart table 10 in its most basic simplified design and construction has a base 12, top platform or table top 14, at least one telescopic leg or linear threaded rail support 16, microprocessor board or CPU 20, depth sensors 21 and wall(s) 19. The smart cart 10 may also include wheels 13 and a cup holder 22 and plate holder 24 on or defined by the table top platform 14 and bumpers 15 around the base 12 and top platform 14. The base 12 and top platform 14 are joined by at least one telescopic support leg 16 which facilitates the raising and lowering of the top platform with an electrical or hydro-electric piston system. The invention 10 may include 2-4 support rails or legs 16 for enhanced stability or weight handling capacity. The support rail(s) 16 preferably include a threaded rod that is rotated in a screw mounted plate by a lifting motor 18 to raise and lower the plate when rotated in opposite directions but may also include a linear actuator or piston that is mechanically and electrically connected to the lifting motor 18 for lowering and raising the plate by way of the support rail 16. The motor 18 may be securely housed in the base 12. The top platform 14 is encased by a shock absorbing bumper 15 and houses the CPU motherboard 20 which contains and controls all the electronics of the instant invention 10. The CPU or motherboard 20 is a microprocessor and receives and sends signals such as to mobile communication devices and the depth sensors 21, The depth sensors 21 may include infrared, acoustic or comparable sensors that detect walls, furniture, and other objects in a room as the smart table 10 navigates. A rechargeable battery is preferably secured in the base 12 for powering the CPU 20 and is recharged in a docking station. The table top platform 14 may be a square, rectangular or circle shape as shown in FIGS. 8 and 9. The support leg rail 16 can completely recess wherein the table top platform 14 joins the base 12 for convenient storage, as shown in FIG. 3. The smart table 10 also has memory to store data and can be voice controlled and communicate with Alexa.

Figure 10:
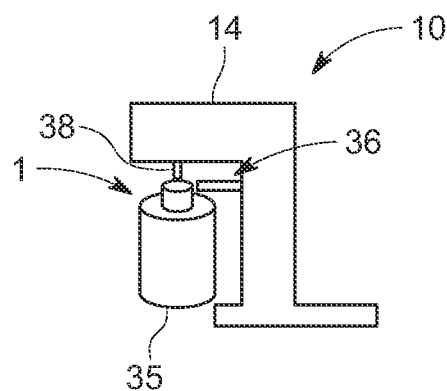
FIG. 10 is a side elevational view of an automated coffee maker that may be added in an alternative embodiment of the automated table device in accordance with the principles of the present invention.
Figure 11:
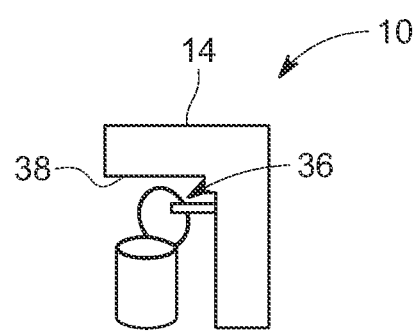
FIG. 11 is a side elevational view of an automated coffee maker in an alternative embodiment of the automated table device in accordance with the principles of the present invention.

Referring to FIGS. 112, the automated smart table 10 includes artificial intelligence (AI) and an app that makes it easy to use and automated and can be controlled by voice or the app on a mobile communication device. The table 10 is adjustable, mobile and intelligent such that it can be used in hospitals, nursing homes, schools or for handicap people to deliver food, beverages, medicine, administer health vitals testing, give reminders for medicine or doctor appointments, provide a computer work station or entertainment. The invention 10 is also ideal for homes and businesses. The automated smart table 10 may be programmed with set points in the house to go to or navigate and with tasks or services to perform. The smart table 10 also connects to the Internet and can log into a property appraiser website to download structure information on a dwelling or building to set navigation parameters. The instant invention 10 may be operated by a plurality of people, such as everyone in a family, hospital personnel or business office workers, wherein each person would have the app. The app can be personalized for individuals for performing certain functions and to navigate certain rooms and stores these settings in memory so an individual can select and activate their personal settings. With reference to FIGS. 10 and 11, in an alternative embodiment, the automated smart table 10 may include a coffee maker 36 that has a coffee cup base 35 that may or may not also act as a heater and coffee dispenser 38 for dispensing coffee into a coffee cup 1. The table device may also include a cup holder 22 or plate holder 24 or connection to or communication with or through the Internet, as well as Bluetooth or Wi Fi.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An automated delivery table device, comprising:
   a base;
   a plurality of wheels mounted to said base;
   a drive motor in communication with said wheels for rotating said wheels to move said base;
   a plurality of vertically stacked lift plates mounted over said base;
   a plurality of lift rails in communication with said lift plates for individually controlling vertical movement of said lift plates;
   an extendable and retractable wall structure in engagement with said lift plates for vertically moving said wall structure with said lift plates;
   a table top mounted over an upper lift plate defined by said lift plates;
   a plurality of lifting motors mounted to said base and corresponding to and communicating with said plurality of lift rails for imparting motion on said lift rails to independently raise and lower said lift plates; and
   a microcontroller in communication with said drive motor and said lifting motors for controlling movement of said base and lift plates.

2. The device of claim 1, further comprising:
   a battery in electrical communication with said microcontroller and said drive motor and said lifting motors.

3. The device of claim 2, further comprising:
   a battery charger in electrical communication with said battery for charging said battery.

4. The device of claim 1, further comprising:
   a communication device app for communicating with said microcontroller to send control commands to move said base and vertically adjust said table top.

5. The device of claim 4, further comprising:
   a receiver in electrical communication with said microcontroller for receiving commands from said app.

* * * * *